Patented Aug. 11, 1942

2,292,737

UNITED STATES PATENT OFFICE 2,292,737

CHLORINE CONTAINING SYNTHETIC RESINS

Alfred Blömer, Imbach, near Opladen, and Wilhelm Becker and Reinhard Hebermehl, Cologne, Germany No Drawing. Application September 10, 1938, Serial No. 229,324. In Germany September 13, 1937

3 Claims. (Cl. 260—84)

The present invention relates to new chlorine containing synthetic resins.

It is known that the chlorination of natural rubber which is generally performed in the presence of a solvent such as carbon tetrachloride, results in a product which represents an excellent raw material for the preparation of lacquers, coatings, impregnations and the like. Also synthetic rubber-like materials such as polymeric butadienes-1.3 and mixed polymerizates of butadienes-1.3 and other polymerizable compounds such as stryrene have been subjected to chlorination. The chlorination products thus obtained differ from chlorinated natural rubber in various respects. Thus, they show too high a viscosity to be suitable for the preparation of spraying lacquers and the like. This disadvantage has been overcome as described in application Ser. No. 224,730 to Alfred Blömer and Wilhelm Becker filed August 13, 1938, by starting from those synthetic rubber-like materials which have been obtained by the polymerization in aqueous emulsion of butadiene hydrocarbons in the presence of such substances as effect an increase of plasticity and solubility of the polymerizate. The resulting chlorination products more closely resemble chlorinated natural rubber as to solubility and viscosity, but still differ therefrom with respect to the chlorine content, the softening point and the behaviour towards drying oils. Chlorinated synthetic rubber of the character described shows a relatively low softening point and is incompatible with drying oils, thus preventing the practical use of these compounds for many purposes. In consequence of the low softening point films, coatings and lacquers prepared therefrom show an insufficient capability of drying. It is, therefore, a problem to prepare a chlorinated synthetic rubber which combines a good solubility and a low viscosity with a high softening point and the capability of being combined with drying oils so as to resemble chlorinated natural rubber in every respect.

We have now found that products of the desired properties can be obtained by effecting the chlorination, (preferably in solution) of synthetic rubber-like materials of the character described at a high temperature of above about 60° C. The chlorination products thus obtained have a higher chlorine content and a higher softening point than those prepared at a lower temperature. This is the more surprising as in the case of natural rubber the chlorine content and the softening point is not materially influenced by the temperature of chlorination. The chlorinated synthetic rubbers which are obtainable in accordance with our present invention even show a higher softening point than the types of chlorinated natural rubber which are to be found on the marked. Our heat chlorination involves the further advantage that the resulting products are compatible with drying oils such as linseed oil and linseed-oil/stand-oil, whereas the products which are obtainable by a chlorination at low temperature are insoluble in such materials. As a result of our experiments we can say that the products which are obtainable in accordance with the present invention and in accordance with the invention described in application Ser. No. 224,730 to Alfred Blömer and Wilhelm Becker represent a valuable substitute for chlorinated natural rubber and are even superior thereto as to the softening point.

Turning now to the advantages involved by the present invention and to the individual steps of the chlorination process in detail, the chlorination can be started at ordinary temperature, an increase of temperature being necessary only at the end of the reaction. A chlorination temperature of about 100–125° effects a higher reaction velocity and a higher softening point than a temperature of about 60° C. As solvents we prefer those which dissolve the starting materials as well as the chlorination products obtained therefrom. Examples of such solvents are chlorinated aliphatic and aromatic hydrocarbons such as chloroform, symmetrical dichloroethane, symmetrical tetrachloroethane and chlorobenzene. In case of carbon tetrachloride there may be observed intermediate products which are insoluble in the solvent but are again dissolved upon continuing the chlorination. The chlorination products can be isolated from the solutions thus obtained in the manner customarily employed for the isolation of chlorinated natural rubber, for instance, by precipitation by means of hot water or by means of methyl alcohol. Moreover, the solutions can be applied to hot rollers, whereby the solvent is evaporated and the final product is isolated in a solid state. For stabilization the solutions can be subjected to a treatment with alkaline reacting substances such as sodium carbonate. Moreover, in order to induce a permanent stabilization to the final products we prefer to incorporate therewith an ethylene oxide derivative such as phenoxypropenoxide.

The term "polymerizates of butadienes-1.3" comprises the products which are obtainable according to the various polymerization processes, for instance, the polymerization in the presence of sodium or in an aqueous emulsion. Moreover, it comprises butadiene-1.3 itself as well as various products of the conjoint polymerization of butadiene-1.3 and other polymerizable substances such as styrene and acrylic acid derivatives. We prefer to start from those polymerizates which have been prepared in the presence of such substances, as effect an increase of plasticity and solubility of the polymerizates as is more fully described in application Ser. No. 224,730 to Alfred Blömer and Wilhelm Becker.

In case emulsion polymerizates are to be employed as starting materials the latex-like emulsions can be converted into solutions in an organic solvent by adding to the emulsion a suitable solvent such as chlorobenzene or carbon tetrachloride, stirring the whole so as to form an emulsion and then removing the water by evaporation in the vacuo. In this manner, a clear solution of the synthetic rubber-like material in chlorobenzene is obtained.

The following examples illustrate the present invention without, however, restricting it thereto the parts being by weight:

Example 1

A solution of 100 parts of a sodium polymerization product of butadiene in 1400 parts of chloroform is saturated by means of chlorine while stirring at 20–25°. The chlorination product thus obtained corresponds to the product of Example 1 of application Serial No. 202,445, filed April 16, 1938. The chlorination is then continued at a temperature of 60° and a pressure of 12 mm. The chlorination product thus formed is precipitated by pouring the solution onto streaming hot water. The precipitated product is stirred with a sodium carbonate solution for removing hydrogen chloride and chlorine which may be mechanically adhered thereto or may be present in the product in a loosely bound state. The chlorination product has a high chlorine content and a softening point of 140°. It is especially suitable for the preparation of lacquers and paints.

Example 2

100 parts of a polymerization product of butadiene and styrene which has been obtained from 25 parts of styrene and 75 parts of butadiene in emulsion in the presence of 1.3 parts of diisopropylxanthogendisulfide, are dissolved in 3200 parts of acetylene tetrachloride and treated with chlorine at 35° until no more chlorine is absorbed. The solution thus formed is heated to 60° while stirring under pressure with the further addition of chlorine. The product is precipitated by stirring the solution into methyl alcohol in the presence of potassium hydroxide. The precipitated product is stirred in water with the addition of 3% of phenoxypropenoxide and then dried at 60°. The chlorine content of the chlorination product thus formed is 3–4% higher than that of the product obtained by mere chlorination at ordinary temperature. It is compatible with linseed oil, linseed oil-stand oil and drying artificial resins as are obtainable for instance by the condensation of glycerine with phthalic acid and linoleic acid. It has a softening point of about 145°.

Example 3

250 parts of a latex containing 80 parts of a mixed polymerizate of butadiene and styrene (obtained by the emulsion polymerization of 75% butadiene and 25% styrene in the presence of 2.5% of diisopropylxanthogendisulfide) are stirred with 1200 parts of chlorobenzene. From the emulsion thus obtained water is evaporated by azeotropic distillation. The clear solution of the polymerization product in chlorobenzene thus obtained is treated with chlorine at 25°, until no more chlorine is absorbed, and then again chlorinated under pressure at 125°. The product is worked up as described in Example 2. The chlorination product thus obtained has a chlorine content of 64.5% and a softening point of 160°.

We claim:

1. The process which comprises contacting chlorine with a solution in an indifferent solvent of a synthetic rubber-like material selected from the group consisting of those having been prepared by the polymerization of butadiene-1.3 and those having been prepared by the polymerization of a mixture of butadiene-1.3 with other copolymerizable substances, the reaction being continued until the chlorination product has become compatible with drying oils, the temperature of the reaction being below 60° C. at the beginning and at least 60° C. at the end thereof.

2. The process as claimed in claim 1 wherein a temperature between 60° C. and about 125° C. is employed at the end of the reaction.

3. The process as claimed in claim 1 wherein there is employed as starting material a product of the conjoined emulsion polymerization of butadiene and styrene.

ALFRED BLÖMER.
WILHELM BECKER.
REINHARD HEBERMEHL.